A. E. TANNER AND E. A. CLAREMONT.
JOINT FOR ELECTRIC CABLES.
APPLICATION FILED MAY 10, 1916.
1,309,158.
Patented July 8, 1919.
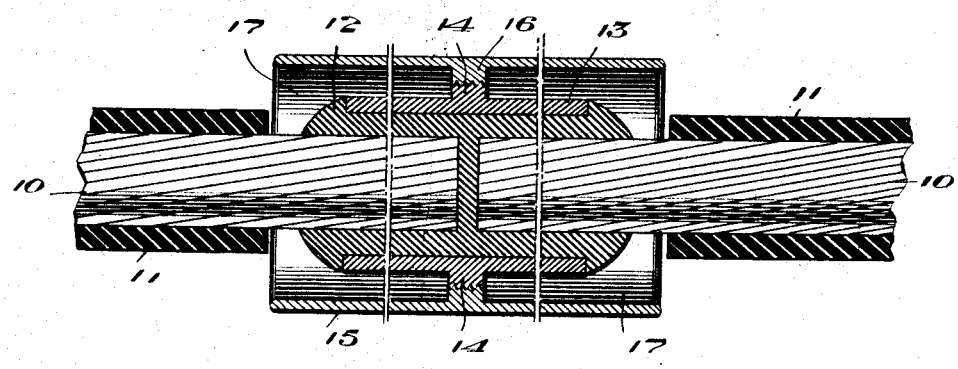

UNITED STATES PATENT OFFICE.

ALBERT E. TANNER, OF STRETFORD, AND ERNEST A. CLAREMONT, OF HIGH LEIGH, ENGLAND.

JOINT FOR ELECTRIC CABLES.

1,309,158.  Specification of Letters Patent.  Patented July 8, 1919.

Application filed May 10, 1916. Serial No. 96,690.

*To all whom it may concern:*

Be it known that we, ALBERT EDGAR TANNER, of Croughton House, Chester Road, Stretford, engineer, and ERNEST ALEXANDER CLAREMONT, of Broom Cottage, High Leigh, Cheshire, England, engineer, have invented a certain new and Improved Joint for an Electric Cable, of which the following is a specification.

This invention relates to couplers for electric cables, and has as its object to provide a joint in which electrical stresses are overcome and electro-static pressure upon the dielectric in the neighborhood of the electrified body is reduced to a minimum.

The above and other objects of our invention are obtained in the structure described in the following specification and illustrated in the accompanying drawings, wherein is shown a longitudinal sectional view through our improved coupler applied to an electric cable.

Referring to the drawings, 10 designates an electric cable which consists of a plurality of strands of wires having an insulating covering 11, which covering is removed from the ends of the cable where the same is to be joined. The cables are placed with their ends in engagement and solder 12 is then poured about the contacting ends and some of the solder will pass into the space between the engaging ends. About the solder is the usual sleeve 13 having intermediate its ends an externally threaded circumferential flange 14. In accordance with our invention we place about the joint so as to inclose the same a metal sleeve 15, which in thickness is about one-eighth of its length, and which has a smooth external surface and rounded ends. It will be seen from the drawing that the outer sleeve 15 is devoid of all sharp edges which might tend to set up electrostatic stresses in the medium surrounding the joint. Intermediate the ends of the sleeve 15 is an internal rib 16 suitably screw-threaded so as to be screwed upon the collar 14, of the inner sleeve.

It will be seen that the outer sleeve 15 provides air pockets 17 about the inner sleeve and solder, and that the outer sleeve 15 is in contact with the joint at one point only, namely, where the internal rib 16 is in threaded engagement with the collar 14, and furthermore, the outer sleeve 15, being in contact with the inner sleeve, is of the same potential as the electrical conductors. By this construction electrical stresses which might be caused by unevenness of, or protuberances extending from, the solder or joint are reduced to a minimum.

While we have shown a particular construction it will be understood that variations in mechanical details may be made without departing from the spirit of our invention, and we do not, therefore, limit ourselves to the exact details shown and described, except in so far as we are limited by the terms of the appended claims.

Having thus described the invention what is claimed is:

1. A coupler for cables comprising an inner sleeve and an outer sleeve, said outer sleeve being spaced apart from said inner sleeve, and being connected to said inner sleeve between its ends.

2. A coupler for cables comprising an inner sleeve and an outer sleeve, said outer sleeve being spaced apart from said inner sleeve and being connected to said inner sleeve between its ends, said outer sleeve having its ends rounded to avoid sharp edges.

3. In a coupler for cables, solder about the ends of the cable, an inner sleeve about the solder, a flange about the sleeve, and a second sleeve having an internal rib adapted to engage said flange, said second sleeve surrounding the joint and providing pockets thereabout.

4. In a coupler for cables, solder about the ends of the cable, an inner sleeve about the solder, a flange about the sleeve, and a second sleeve having an internal rib adapted to engage said flange, said second sleeve surrounding the joint and having a smooth exterior surface.

In testimony whereof we have hereunto set our hands in presence of two subscribing witnesses.

ALBERT E. TANNER.
ERNEST A. CLAREMONT.

Witnesses:
GERTRUDE M. STUCKER,
T. CLAY LINDSEY.

Copies of this patent may be obtained for five cents each, by addressing the "Commissioner of Patents, Washington, D. C."